UNITED STATES PATENT OFFICE.

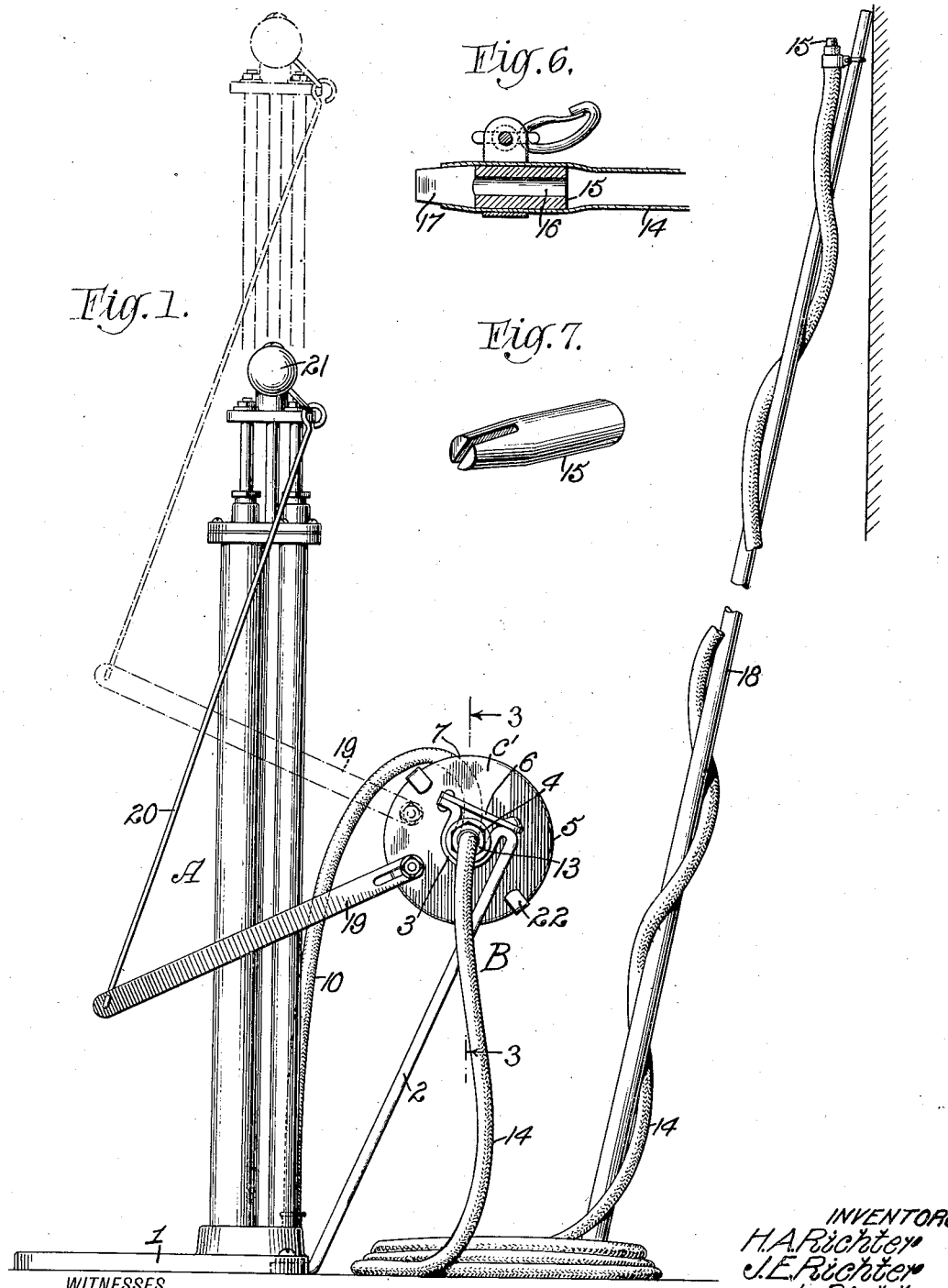

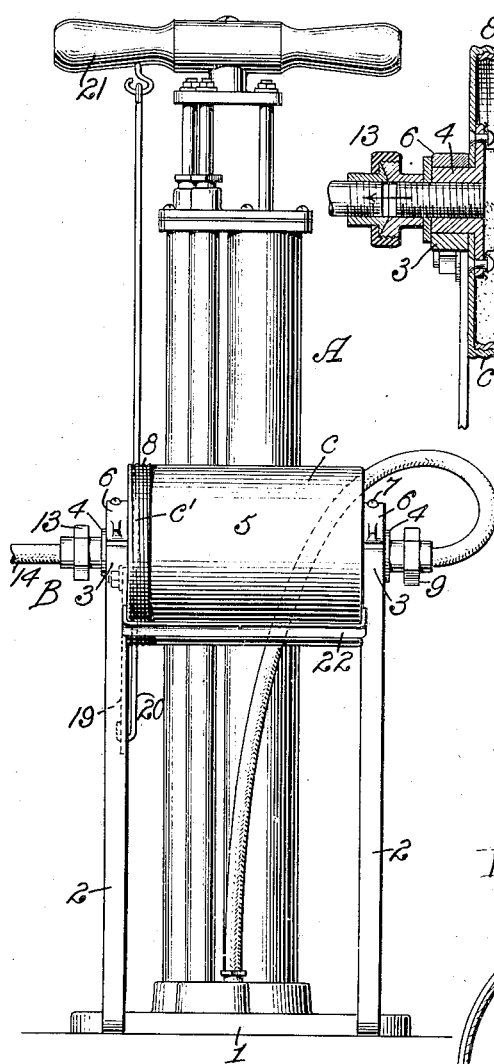
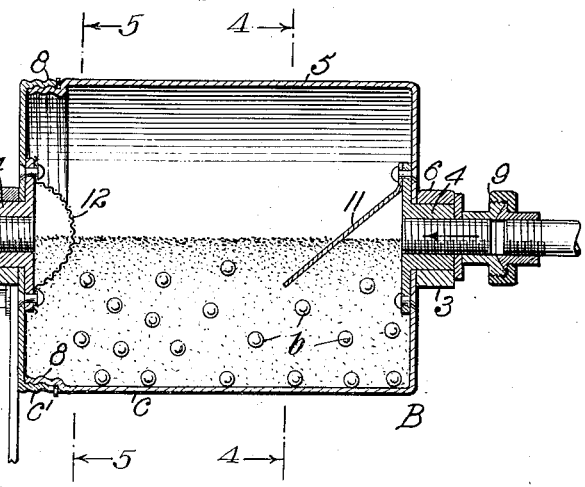
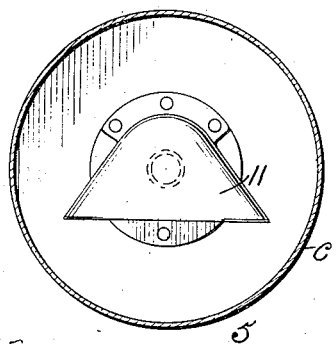
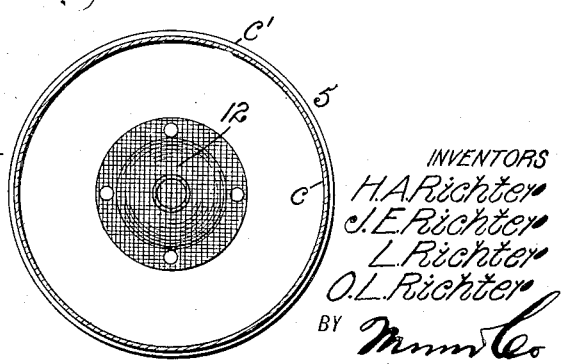

HUBERT A. RICHTER, JOSEPH E. RICHTER, LOUIS RICHTER, AND OTTO L. RICHTER, OF UTICA, NEW YORK.

DUST-GERMICIDE-SPRAYING APPARATUS.

1,204,903.  Specification of Letters Patent.  Patented Nov. 14, 1916.

Application filed July 21, 1916. Serial No. 110,467.

*To all whom it may concern:*

Be it known that we, HUBERT A. RICHTER, JOSEPH E. RICHTER, LOUIS RICHTER, and OTTO L. RICHTER, citizens of the United States, and residents of Utica, in the county of Oneida and State of New York, have invented a new and Improved Dust-Germicide-Spraying Apparatus, of which the following is a full, clear, and exact description.

This invention relates to an apparatus for spraying powdered germicide on trees or garden plants for protecting the same against disease, insects or other destructive agencies.

The invention has for its general objects to improve the construction and operation of devices of the character referred to so as to be reliable and efficient in use, comparatively inexpensive to manufacture, and so designed as to be conveniently portable.

A more specific object of the invention is the provision of a spraying device in the form of an attachment for an air pump, so that by the operation of the pump the powdered germicide can be sprayed on trees or plants.

Another object of the invention is the provision of an oscillatory container for the germicide which is operatively connected with the handle of the pump, so that by the reciprocation of the latter the container is oscillated and the air from the pump passes through the container and through a discharge conduit connected therewith. The conduit is provided with a spraying nozzle, there being in the container novel means whereby the air has a most effective action on the powdered germicide to cause the latter to be entrained with the air.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the apparatus; Fig. 2 is a front view; Fig. 3 is an enlarged sectional view on the line 3—3, Fig. 1; Figs. 4 and 5 are transverse sections respectively on the lines 4—4 and 5—5, Fig. 3; Fig. 6 is a detail sectional view of the spraying nozzle and end of the hose; and Fig. 7 is a perspective view of the spraying nozzle.

Referring to the drawing, A designates a hand pump of any approved construction, the one shown being commonly employed for automobile tires, so that the pump need not be explained in detail.

The germicide spraying device is in the nature of an attachment B which is applied to the pump so as to form therewith a unitary structure. Attached to the base 1 of the pump are upwardly extending brackets 2 which have bearings 3 at their upper ends to receive the journals 4 on the ends of an oscillatory container 5 which holds the powdered germicide. Each bearing 3 is provided with a keeper 6 pivoted at 7 so that it can be swung to and from a position over the journal 4 to normally retain the container in place, but which permits of the ready removal of the container from the brackets 2 for the purpose of charging the container with the germicide. The container comprises a body $c$, and a cover $c'$ which is fastened in any suitable manner, as, for instance, by screw threads 8. The journal 4 at one end has a central opening to form an inlet for the air, there being a suitable coupling means 9 for connecting the inlet with a hose 10 of the pump A. Over the inlet and fastened within the container is a deflector 11 which directs the incoming air against the powder so as to agitate the same and cause the powdered germicide to be entrained with the air as it passes through an outlet in the journal 4 at the opposite end of the container. Over the outlet is a screen 12 which serves to prevent clogging of the outlet with the germicide. The outlet is connected by a suitable coupling 13 with a long hose 14 which has on its extremity a spraying nozzle 15, as shown in Figs. 6 and 7. This nozzle has a central passage 16 and a transverse orifice 17, whereby the powder is discharged in a fan-like stream. In order to hold the nozzle at a high elevation, as when spraying trees, a pole 18 is employed, and to this pole the nozzle end of the hose 14 is suitably fastened and the hose can be coiled around the pole for convenience in manipulation. Balls or pebbles $b$ assist in agitating the germicide.

The container 5 is adapted to be oscillated automatically during the operation of the pump. For this purpose the container has fastened to one end thereof a crank arm 19 which is connected by a link 20 with a handle 21 of the pump, so that as the handle moves up and down between the full and dotted line positions, Fig. 1, the container 5 is oscillated. The operating crank is shown fastened to the cap or cover c', and to prevent the unscrewing of the cover, clamping clips 22 are engaged with the cover and body of the container.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

The spraying apparatus may be used in dwellings or other buildings for spraying powder into any place where it is desired for removing insects, vermin or microbes, and it may be also used wherever disinfectant is required, as around stables or debris piles.

Having thus described our invention, we claim as new and desire to secure by Letters Patent:

1. The combination of a pump including a piston and cylinder, with a germicide spraying attachment comprising a container, means located at one side of the pump for mounting the container to rotate on an axis transverse to the axis of the cylinder and to one side of the latter, means connected with the container and piston, whereby the reciprocation of the latter rotates the container, a hose between the cylinder and container for conducting air into the latter, a hose connected with the container for receiving germicide therefrom, and a spraying device connected with the hose.

2. The combination of a piston and cylinder pump, brackets carried thereby, an oscillatory container mounted on the brackets with its axis transverse to the axis of the cylinder, a crank on the container, a link connecting the crank with the moving part of the pump cylinder, a hose connecting the pump with the container, and a discharge nozzle-carrying hose connected with the container.

3. The combination of a pump, brackets fastened to the base thereof and having journal bearings, a container having journals disposed in the bearings, keepers on the bearings to removably retain the journals therein, means for oscillating the container from a moving part of the pump, a hose connected with the pump, a coupling between the hose and a container, a nozzle-carrying hose, and a coupling between the last-mentioned hose and container.

4. In a germicide spraying device, an oscillatory container for powdered germicide having an air inlet at one end and an air outlet at the opposite end, a deflector in the container and disposed in line with the inlet opening for deflecting air into the germicide, and a screen over the outlet.

5. In a germicide spraying device, a rotary container having journals provided with apertures for the admission of air at one end and the outlet of air and germicide at the opposite end, and a deflector disposed in the container and in line with the inlet.

6. In a germicide spraying device, a rotary container having journals provided with apertures for the admission of air at one end and the outlet of air and germicide at the opposite end, a deflector disposed in the container and in line with the inlet, and a screen within the container and disposed over the outlet thereof.

HUBERT A. RICHTER.
JOSEPH E. RICHTER.
LOUIS RICHTER.
OTTO L. RICHTER.

Witnesses:
 FRED. W. GERNER,
 WILLIAM J. WUEST.